May 16, 1967  R. L. GALE ET AL  3,319,373
STABLE LOBSTER TRAP
Filed Aug. 26, 1964  3 Sheets-Sheet 2
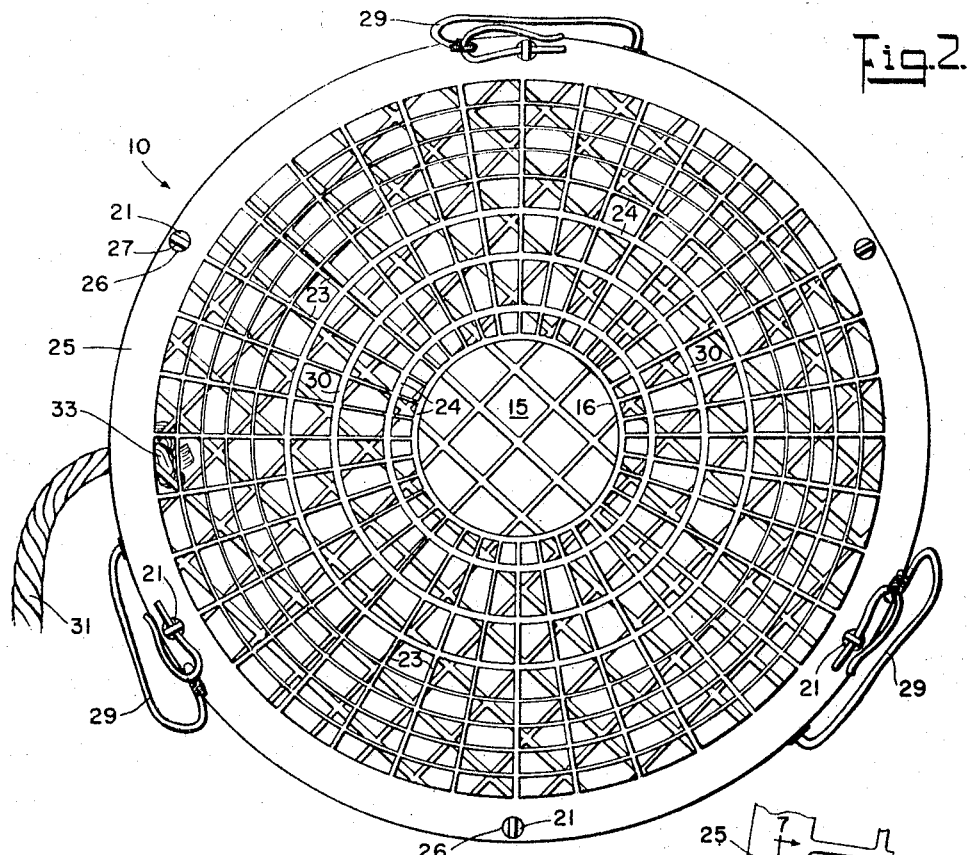
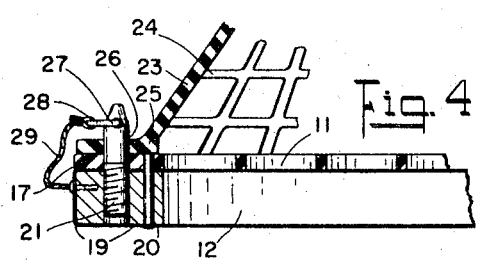
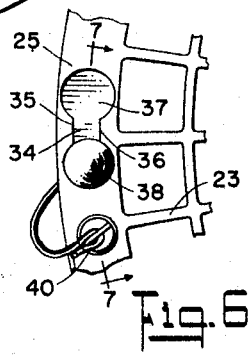
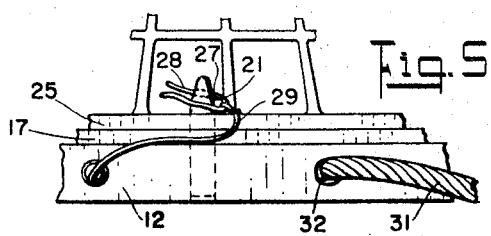
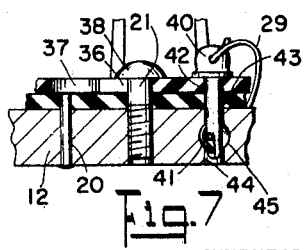
INVENTORS
Reginald L. GALE
James Ian MacDONALD
by R.J. Filipkowski
PATENT AGENT

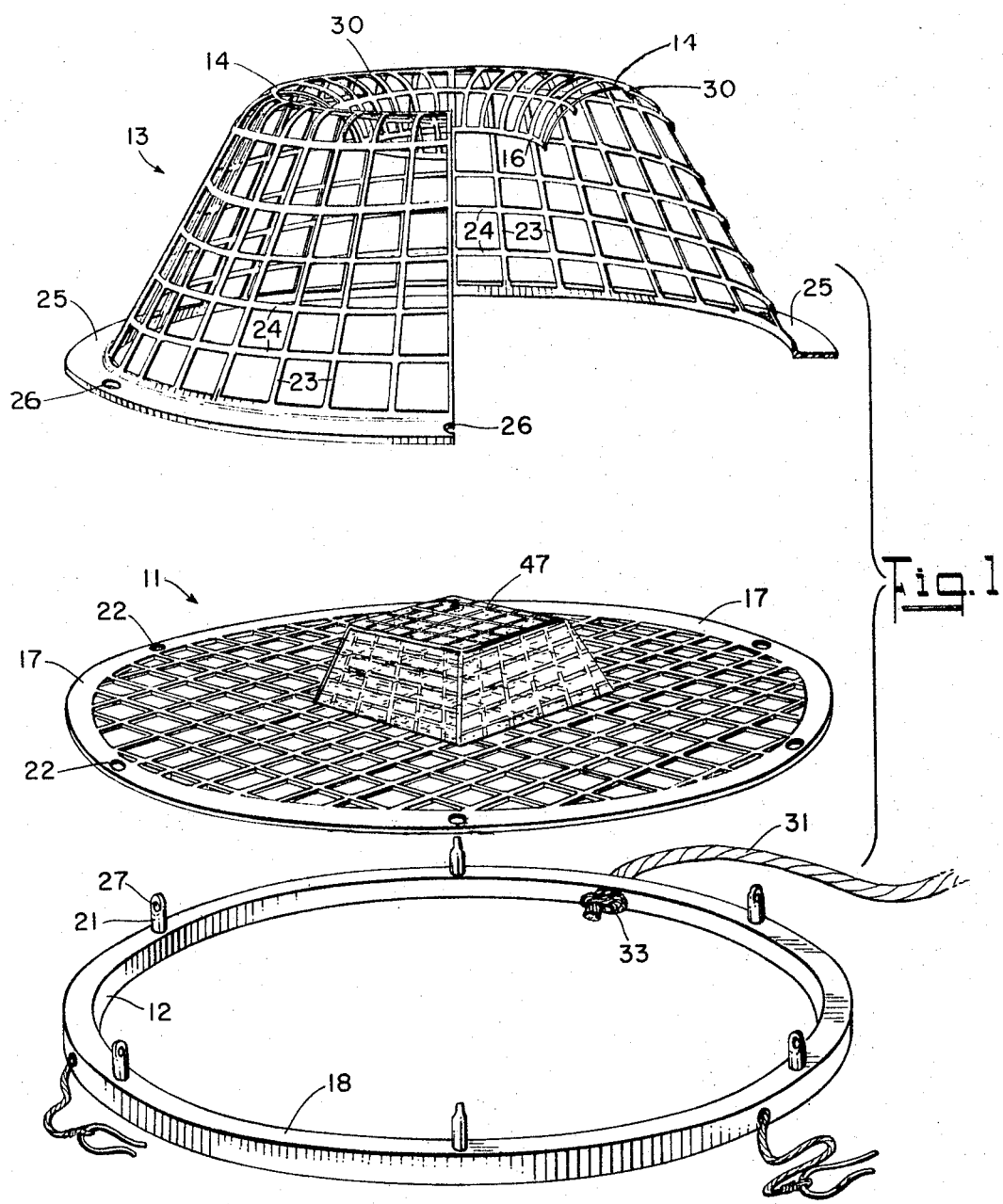

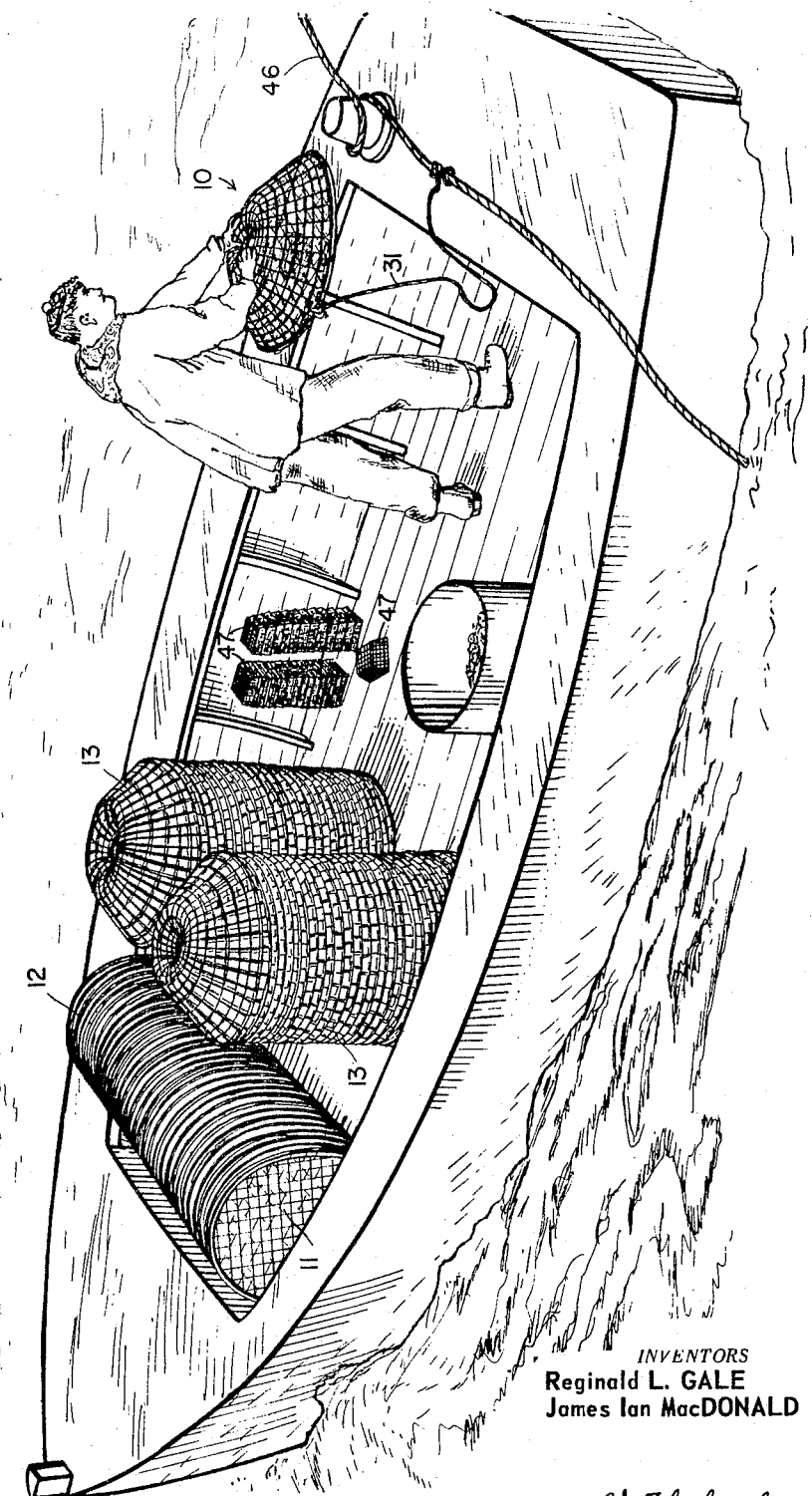

United States Patent Office 3,319,373
Patented May 16, 1967

3,319,373
STABLE LOBSTER TRAP
Reginald L. Gale and James Ian MacDonald, Amherst, Nova Scotia, Canada, assignors to The Markland Works Limited, Amherst, Nova Scotia, Canada
Filed Aug. 26, 1964, Ser. No. 392,177
5 Claims. (Cl. 43—100)

This invention is an improved trap to be used in the fishing industry, for selectively trapping marine animals inhabiting the sea bottom, such as lobsters and crabs.

Conventional crustacean traps have a generally rectangular box-like form and are constructed by nailing a lattice-work of horizontal wood strips along upright arched frames joined to base sills, which latter are similarly slatted to form a floor. The trap ends or sides are provided with opposed net funnels known as "heads" extending inwardly and providing a slightly inclined ramp terminating a few inches above the floor. Lobsters are lured toward the trap by bait secured in any manner in its interior. Unless the quarry approaches the trap directly toward an entry opening, it wanders aimlessly over the trap sides near the bait, and fails to gain entry.

Such wooden traps are found to have a service life of three seasons at best, due to rotting and storm damage. Bottom currents due to tides and waves frequently overturn and roll traps about, due to their relatively low immersed weight and high silhouette. Their metal fittings tend to corrode, and in deteriorating repel crustaceans. The trapping efficiency of a wooden trap is impaired when it is first put down at the opening of the season, since seawater slowly displaces air from the wood pores. The ensuing bubbling sound or "singing" deters lobsters for as long as three to five days at the most profitable part of the season. If such trap makes a large catch, lobsters can be lost as the trap is lifted, by freely slipping out by way of the head openings. To these disadvantages may be added the fact that the shape, bulk and weight of the trap make its handling when lifted out of the water burdensome, and greatly restrict the number a vessel may load and service.

We provide, according to our invention, an improved trap of novel form, assembled from two separable structural parts of reticulate form molded of an inert, resilient plastic material, comprising a planar disc-like base portion and a surmounting integral lattice-work body portion shaped as a frustum, having its larger end connected with the periphery of the base portion to provide a closing bottom, and having its narrower end terminating in an upwardly domed closing wall formed with a central reentrant aperture narrowing downwardly and forming an entry passage into the trap.

In carrying out invention into effect, we form the trap enclosure preferably of a high molecular weight polyethylene, molding the base disc portion as a flat network and the lattice-work shell-walled body portion as a self-supporting conic wall of upright ribs and integral girdling rings with the inclination of the shell wall to the horizontal lying in the range from about 57° to about 50°, and with an integral domed closing wall which has a low silhouette so that the trap height is less than half the diameter of the base disc.

To assure a low center of gravity which is offset to lie below the center of buoyancy, we provide a rigid metal weighting frame ring suitably coated to resist corrosion, having a diameter not less than the base disc diameter and preferably coextensive therewith, which is permanently secured to the periphery of the base disc. Such annular or toroidal frame ring contributes the largest part of the weight of the trap in air, for example weighing from 16 to 20 pounds for a trap diameter of 22 to 24 inches, out of a total trap weight of from 18 to 23 pounds. The ratio of the trap weight in air, to the loss of weight when immersed, which may be taken as a criterion of its mooring efficiency and stability, is therefore high, particularly when compared with prior forms.

The body portion and the base assembly are made engageable by relative axial displacement to assemble the complete trap in from two to six equally-angularly spaced joining positions, employing quick-release fasteners to retain the parts in assembled relation.

The entry passage is made large enough, for example with a minimum diameter of about 6 inches, to permit taking lobsters out of the trap and to facilitate servicing the bait or lure device. Preferably, the bait is enclosed in a lattice-work container which rests upon and is secured to the base disc at the center. By so disposing the bait, in conjunction with the shape of the body portion and the sidewall angle, lobsters lured toward the trap and climbing the body portion from any direction, will sense they are nearing the bait as they progress toward and into the entry passage. The luring efficiency of the arrangement is therefore optimum.

A trap of the configuration described has a low silhouette, which, together with its inherently high moment of inertia about any transverse axis and its low center of gravity spaced below its center of buoyancy, makes the trap ideally stable on any type of sea bottom, even when subjected to currents strong enough to sweep away and tangle conventional traps. Since the trap derives its structural rigidity largely from the metal weighting frame ring, a very small fraction of its total weight represented by molded plastic attains a strong and durable trap, whose body portion is so formed as to be inherently capable of withstanding substantial axial loads. Moreover, the weight of the trap in air is only a little more than its weight when immersed, and is much less than the weight of conventional traps when water-logged. The trap descends rapidly and stably to sea bottom, settling in an upright position, and on being lifted is more prone to maintaining a favorable inclination for retention of its catch. When the trap is moored by a bridle or snood rope secured to the weighting frame ring at one or two attachment points, it will withstand large pulls, favoring recovery should the trap be snagged or jammed in rocks, unlike prior art forms.

It is therefore a principal object to which the making of the present invention has been directed, to provide a separable trap construction allowing of compact storage wherein like parts may be nested closely one against the other, to increase by a large measure the stowing capacity of a fishing vessel.

It is another object to which the making of our invention has been directed, to provide a trap having a peripherally weighted planar base disc portion and a body portion which is circular in plan form and of low silhouette and smoothly faired form, of open lattice-work construction to minimize drag forces due to bottom currents, and hence to improve the stability of mooring on sea bottom.

It is yet a further object to which the making of our invention has been directed, to provide a trap form such that lobsters lured toward it will inevitably be led up the trap sides toward the entry passage which is centered in the upper side of the trap, so that whatever the direction of their approach, the animals will decrease their distance to the bait as they move toward the entry opening.

Still another object to which the making of our invention has been directed, is to provide a trap which has improved retentivity for animals entering the trap, and from which the animals will not tend to escape while the trap is in canted position as it is hauled up for examination.

Yet another object to which the making of our invention has been directed is to provide a trap of greatly increased strength and improved service life, which may be constructed with a minimum of structural materials at low cost and which is far easier to handle and service at sea than any known trap.

The foregoing and still other objects will be made apparent from a study of the following description of its preferred embodiments, together with the accompanying figures of the drawing, wherein:

FIGURE 1 shows a perspective view of a trap constructed according to our invention, with the component parts separated axially in pre-assembly relation, the body portion being cut in partial section;

FIGURE 2 shows a plan view of the assembled trap;

FIGURE 3 shows the traps both in stacked and nested stowed relation, as carried on a fishing vessel and being set out along a trap line;

FIGURE 4 is a vertical diametral cross section in enlarged scale taken along the section line 4—4 of FIGURE 2 showing details of the assembly;

FIGURE 5 is a side view of the fastening means shown in FIGURE 4;

FIGURE 6 shows a portion of the margin of an assembled trap in plan view, showing an alternative assembly fastener; and, FIGURE 7 shows the detail of the fastening means of FIGURE 6 in a vertical cross-section along line 7—7 therein.

Referring to the drawing, FIGURES 1–5, a trap assembly generally designated 10 therein comprises a disc base portion 11, a weighting frame ring 12, and a latticework shell wall body portion 13 having an upwardly domed closing wall 14 and a re-entering down-turned entry passage 15 terminated by a throat ring 16.

The disc base 11 preferably comprises a one-piece molded network of square mesh form as shown; alternatively, a network comprising concentric rings and radial ribs may be provided (not shown), or of any other reticulate construction to form a bottom wall for the trap which is open to escape by undersize animals, but which will bar the egress of crustaceans of marketable size. The metal frame ring 12 is secured to the margin 17 of the base disc, which margin is preferably an integral annular strip or band radially coextensive with the ring. The latter, preferably, is a thick strong annulus of dense metal having at least one planar side 18, and of sufficient weight so that the trap will be adequately anchored on any type of sea bottom despite currents due to tides or storms. When the frame ring is made of a corrodable metal such as steel, it is preferably corrosion proofed by a coating layer 19. The layer may be any suitable inert material such as a polyester or epoxy resin, either filled or unfilled, or it may be simply a partly thermally degraded adhering skin formed by the known method of immersing a steel ring heated to redness into molten pitch or asphalt, and draining excess material when the ring has cooled below the boiling point of the bitumen.

The frame ring is secured to the base disc portion in a relatively permanent manner, according to one embodiment, by fastening means such as rivets 20 spaced about the periphery of the frame ring. Preferably, the frame ring is mounted on the underside of the base disc, so that in ordinary service and handling the base disc network is protected from abrasion. A number of studs 21 bolted into or otherwise affixed into the ring to project from its flattened side 18 extend through the margin 17 of the base and through apertures 22 formed therein to pass the studs. The studs are spaced equi-angularly about the ring periphery and may comprise any number from two to about six.

The pre-assembly of base discs and weighting frame rings will be preferred to protect the relatively flexible discs in stowing and handling as such units require no greater storage volume when assembled than when stacked separate, and facilitate completion of the assembly when at sea. Nevertheless traps may readily be assembled from the three parts as shown in FIGURE 1, with the base disc otherwise unsecured to the ring except by being held captive between the flanged body portion and the ring, as will be made apparent hereinafter.

The base disc and the body portion may be formed of any inert structural plastic material having a density nearly the same as water and which is tough and wear-resistant. Suitable non-brittle resilient plastics include, among others, high density and low density polyethylenes, polypropylene, and the nylons. A material which is slightly buoyant is preferred, in order to provide a center of buoyancy for the assembled trap lying above its center of gravity. High molecular weight linear polymers of ethylene are an eminently suitable material, being inert in sea water, and combining excellent strength in thin sections with a high degree of toughness, resilience, and freedom from permanent set when deformed. Its density of about 0.96 assures a slight positive buoyancy so that if the body portion or base of a trap become separated, they rise to the surface, facilitating recovery. Structural plastic materials that include plasticizers and certain copolymers which give off obnoxious flavours, should generally be avoided where tests show these to have a possibly repellant effect for crustaceans.

The body portion 13 comprises an axially short frustum formed as an array of upright ribs 23 integrally joined with concentric girdling rings 24. The lower periphery 25 of the frustum is formed with an outwardly projecting flange, pierced by a series of apertures 26 equi-angularly spaced about the margin and equalling in number and angular spacing the number and spacing of the fasteners 21, so that the flange may be set in any one of a number of attachment positions upon the disc margin 17 in registry with its apertures 22 and with the studs.

One suitable form of quickly-detachable fastener comprises studs 21 having their upper ends transversely pierced by a hole 27, the axis of the hole being perpendicular to a radius of the frame ring. A plurality of corrosion-proofed spring pins 28 secured to the frame ring in any suitable manner, as by flexible keeper cords or thongs 29, are passed through the holes 27 when the body portion has been set on the base with the studs 21 received in the apertures 26.

The closing wall 14 comprises continuations of predetermined ones of the upright ribs 23, and further concentric ring portions 24, whereof a ring 30 disposed at the uppermost part of the wall 14 is deepened and generally sttiffened to strengthen the structure. The entry passage 15 has a reticulate wall 15A comprising further rings and smoothly faired downwardly-bending rib continuations, terminating in a reinforcing throat ring 16 serving to maintain the circular shape of the passage. The internal diameter of the ring is chosen to readily permit withdrawal of undersize lobsters and ejection of females carrying egg pouches. The sorting of lobsters may be effected either by their removal through the entry passage, or the trap may be dis-assembled by pulling out the spring pins from studs 21 and lifting off the body portion. A throat diameter of about six inches has been found suitable.

The diameter of the trap at its largest part may be as little as eighteen inches; a preferred size has an internal diameter inside margin 25 of about twenty-two inches, which allows a trap having a height of about eleven inches to hold a considerable catch. When such trap is weighted by a metal frame ring of from sixteen to twenty pounds weight, and the weight of the plastic material totals about 1.8 pounds, giving it an immersed weight of about fourteen to eighteen pounds, it will be apparent that the weight of the trap in air will be large in relation to the loss of weight on immersion. Smaller traps, or still larger traps ranging to thirty inches diameter or larger, may be similarly constructed. It is of interest that a nearly linear relation between trap weight and trap diameter is exhibited by such traps for a wide range of sizes.

As may be seen from FIGURES 2, 4 and 5, the snood rope 31 is joined to the weighting ring, through which any force needed to move the trap in ordinary handling may be safely applied to the entire assembly. The ring constitutes the principal framework which gives the trap its strength and rigidity. An eye 32 is provided to aperture the ring radially, into which the end of the snood rope is inserted. Such aperture, for example a 7/16-inch bore, does not appreciably weaken a ring whose thickness is at least three-quarters of an inch. A knot 33 is formed on the captive end of the rope. This mode of connection, wherein the ropes lead out radially, enables as many assembled trap bases to be stacked in a given volume or stowed in side-by-side relation as in FIGURE 3, as when the ropes are not fitted.

An alternative fastener shown by FIGURES 6 and 7 comprises the arcuate slots 34 formed in the marginal flange 25, having parallel side walls 35, 36, and a circular aperture 37 of a diameter larger than the slot width formed at one end thereof. The weight ring carries a plurality of studs 21 having enlarged domed heads 38 formed with flat underfaces 39. The slot width is just large enough to receive the stud shanks, while the aperture 37 just passes the domed heads. After the body portion has been axially registered against the base with the studs received in apertures 37, a fractional turn applied to the body portion rotates the flange 25 to hold the latter captive beneath the underfaces 39. A drop pin 40 having a spring keeper 41 bowed to protrude radially from its shank is pressed into registering aperture 42 in margin 25, into aperture 43 in the base disc margin 17, and into the bore 44 in the ring 12. The bore 44 has an annular groove 45 of larger diameter into which the spring keeper 41 is pressed, preventing accidental withdrawal. An anchoring cord 29 prevents loss of the pin.

It will be seen that the body portions 13 may be closely stacked together in nested relation. A fishing vessel of modest size may therefore easily store a large number of traps as groups of component bases and body portions, as illustrated in FIG. 3. When the disc bases have been previously pre-assembled to the weighting frame rings and the latter have their snood ropes connected and knotted, a two-man crew is able to assemble each trap base with a body portion, and to tie the snood rope to the trap line 46 after baiting the trap, in a fraction of a minute's work. A very large number of traps may be put down in a fishing area in a single day, whereas the setting out of the same number of conventional traps would occupy several days and would lose the more plentiful catch in the opening days of the trapping season.

The bait may be carried in any suitable manner, provided it is disposed centrally of the trap base and below the throat of the entry tube. A suitable bait receptacle is an inverted lattice-work container such as that designated 47, which is formed like a conventional stackable berry box having its sides and bottom formed of plastic network of small mesh size. The container is affixed centrally on the disc with a piece of bait enclosed therein and may be secured to the base network in any manner, for example by ties formed of plastic-coated wired paper strips (not shown). Whatever the form of bait container, a clear distance of about six or seven inches should be provided between the throat ring and the top of the container.

The handling of the trap is easy both in the boat and in the water, due to its configuration and weight distribution. When the assembled trap is rested on a gunwale, its low center of gravity and relatively large moment of inertia allow it to rest stably despite considerable rocking of the boat. The trap descends rapidly and with relatively little gyration, due to the nature and direction of the drag forces exerted by seawater on the plastic networks. The raising of the trap is facilitated due to its relatively planar form and low cross-sectional area when towed in a direction parallel to its base. The low center of gravity, combined with its low height, large diameter, and large moment of inertia about a transverse axis, make the trap ideally stable on any bottom. The smoothly faired form tends to avoid entanglement of the trap in rocks and other objects on the seabed, while the strong attachment of the frame ring to the trap line prevents loss and permits ample force to be applied in freeing a trap that may have fouled on an obstruction.

In summary, traps constructed according to the teachings of our invention are characterized by a greatly extended service life, by greatly improved handling and storing facility, and by excellent luring and trapping efficacy. In addition to low first cost, they have the merit of requiring negligible upkeep, and permit replacement of components at low cost.

We claim:

1. A separable lobster trap having component parts adapted for close nesting, comprising a reticulate planar disc base having a weighted and stiffened annular margin, and a unitary lattice-work shell body portion formed as a frustum, said shell body having its upper end closed by an integrally joined upwardly domed portion carrying a centered depending tubular entry, and having a thickened integral radial flange extending from the larger end thereof adapted to be secured detachably in contiguous overlying relation upon said margin, said margin carrying spaced upright fastening members and said flange having spaced apertures to receive said fastening members passed therethrough, and means on said fastening members adapted to engage the upper side of said flange for preventing axial removal of said shell body from said base.

2. A trap as set forth in claim 1 wherein said weighted portion of said annular margin comprises a rigid metal ring secured thereon and said fastening members project from said ring.

3. A trap as set forth in claim 2 wherein said fastening members comprise parallel studs, said studs being pierced transversely to receive and releasably retain said means on said fastening members.

4. A trap as set forth in claim 2 wherein said fastening members comprise parallel studs, each of said studs having a shank portion joined to an enlarged head, and each of said apertures comprising an arcuate slot formed with a circular aperture adjacent one end to pass said head and the remaining slot portion being adapted to freely receive said shank but to prevent axial movement of said head therethrough.

5. A trap as set forth in claim 2 wherein said shell body and said disc base are formed of polyethylene and the weight of said metal ring is about ten times the weight of said polyethylene, whereby the center of gravity of the trap is spaced below the center of buoyancy along the trap axis.

References Cited by the Examiner

UNITED STATES PATENTS

| | | | |
|---|---|---|---|
| 1,797,743 | 3/1931 | Wesson | 43—65 XR |
| 1,887,059 | 11/1932 | Kraus et al. | 43—105 |
| 3,232,000 | 2/1966 | Gale et al. | 43—100 |

FOREIGN PATENTS

| | | |
|---|---|---|
| 1,350,573 | 12/1963 | France. |
| 5,262 | 4/1888 | Great Britain. |

SAMUEL KOREN, *Primary Examiner.*

WARNER H. CAMP, *Assistant Examiner.*